United States Patent [19]

Hagenah

[11] 3,858,889

[45] *Jan. 7, 1975

[54] TONE ARM FOR RECORD PLAYERS AND RECORD CHANGERS

[75] Inventor: Hans-Gerhard Hagenah, St. Georgen/Schwarzwald, Germany

[73] Assignee: Firma-Perpetuum-Ebner, Fabrik fur Feinmechanik Und Elektrotechnik Steidinger & Co. kom. ges., Georgen/Schwarzwald, Germany

[ * ] Notice: The portion of the term of this patent subsequent to Oct. 7, 1999, has been disclaimed.

[22] Filed: Aug. 16, 1965

[21] Appl. No.: 479,983

[30] Foreign Application Priority Data

Jan. 29, 1965 Germany .............................. 35972

[52] U.S. Cl. .............................................. 274/37

[51] Int. Cl. .............................................. G11b 3/02

[58] Field of Search .............. 274/23, 24, 1, 1.9, 10, 274/25, 26, 37; 179/100.41, 100.41 S, 100.41 ST

[56] References Cited

UNITED STATES PATENTS

| | | | |
|---|---|---|---|
| 2,257,040 | 9/1941 | Daniel | 274/24 |
| 2,295,904 | 9/1942 | Kurkjian | 274/1 |
| 2,354,558 | 7/1944 | Thompson | 274/24 |
| 2,455,466 | 12/1948 | Brubaker | 274/23 |
| 2,568,671 | 9/1951 | Vistain | 274/24 |
| 3,139,284 | 6/1964 | Hammond | 274/24 |
| 3,281,154 | 10/1966 | Schmetter | 274/24 |

*Primary Examiner*—Harry N. Haroian

[57] ABSTRACT

A mounting for supporting a pickup or a tone arm includes an elongated flat plate having a weakened portion to serve as a pivot at one end and a screw threaded tilt adjustment at the other end.

3 Claims, 2 Drawing Figures

PATENTED JAN 7 1975

3,858,889

Inventor:

HANS-GERHARD HAGENAH

Fisher, Christen, Sabol + Caldwell

TONE ARM FOR RECORD PLAYERS AND RECORD CHANGERS

This invention is concerned with a tone arm for record players, especially record changers, having a tone arm with a record scanning system such as a pickup cartridge arranged in the tone arm.

High grade scanning systems for phonograph records require a precise setting of the inclination of the longitudinal axis of the stylus holder with respect to the phonograph record to a standard value of 15°. If this inclination angle is set inexactly, a great increase in the scanning distortions will be observed, above all in the case of those portions of the sound grooves which are more deeply cut, which fact will become noticeable in a disturbing way, especially when playing stereo records.

A possibility for adjusting the inclination angle would be of advantage in the case of single record players, in order to increase their reporduction quality. In this case, since there is only one record at any time on the turntable, the correct adjustment can be found. In the case of record players with a record changing mechanism, different numbers of records may be placed on the turntable, for example, anywhere between one and ten records. Correspondingly, there will be a difference in the height of the stack of records of more than 20 mm between the lowest and the topmost record, and it will be clear that the inclination angle for the lowest record will be a different one from that for the topmost record, a fact which will give rise to the above mentioned undesirable scanning distortions.

An object of the invention is to make the inclination angle of a phonograph pickup system adjustable. In the case of the more simple record changer, at least two defined adjustments of the inclination angle are provided. For high grade record players, especially for those with automatic record changing, the adjustment of the inclination angle is either to take place mechanically in accordance with the height of the stack of records or through other automatic control means.

The proposal has already been made to provide the tone arm with a pivot point which is adjustable in height, so that the tone arm would always rest horizontally on the uppermost record, independently of the height of the stack of records, and the scanning system would always thus be inclined at the prescribed angle of 15° in relation to the plane of the record. However, this solution is very expensive and it requires numerous mechanical, parts which are prone to trouble.

As compared to all this, the proposal is made in this invention that the scanning system, for the purpose of adjustment of the inclination angle, is to be arranged for tilting movement in the tone arm. Since the inclination angle is determined by the longitudinal axis of the scanning system and the plane of the record, the tilting of the scanning system must naturally take place around an axis which runs transversely in relation to the tone arm.

In a preferred embodiment of the invention, the scanning system has been arranged on a supporting element which is mechanically deformable when adjusting the inclination angle.

In accordance with the invention, the inclination angle can be continuously manually varied on the tone arm, preferably through turning a screw.

Furthermore, the supporting element, according to the invention, may have devices, preferably in the form of slots for longitudinal sliding of the pickup cartridge so that both the inclination angle as well as the overhang are adjustable. According to the invention, the supporting element can furthermore act as a static shield of the tone arm housing.

In the case of record changers, it will be effective to provide for at least two stop locations, in order to make possible, on the one hand, an optimum playing in a single record playing operation and, on the other hand, in order to be able to switch to the changer operation, in which, as has already been mentioned, a different number of records may rest on the turn table. In that case one may set the scanning system in such a manner that the inclination angle will be disposed at a mean value, so that during playing of both the first as well as the last, for example the tenth record, the scanning distortions will remain within bearable limits.

The following description of a preferred embodiment of the invention will serve in connection with the attached drawings to explain the operation of the invention.

Figure 1:
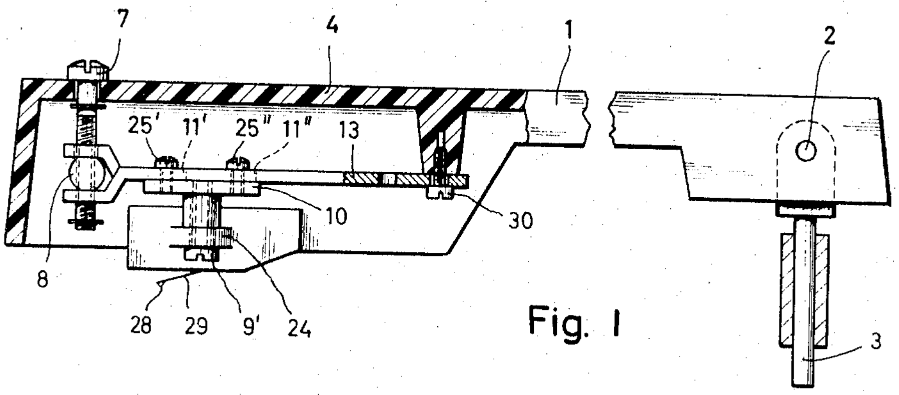
FIG. 1 shows a sectional elevation of the preferred form of the invention with a mechanically deformable carrying element.

FIG. 1 shows a conventional tone arm 1, which is rotatable for the purpose of lifting or lowering about a horizontal pivot 2 which is mounted on a vertical pivot 3. The forward housing 4 of the arm 1 contains a plate-shaped supporting element 13 which is mounted at one end for deformation on a horizontal axis with respect to the housing 4 which is arranged transversely with relation to the longitudinal extent of the tone arm 1. An adjusting screw 7 has its upper end mounted rotatably in the housing 4 with its threaded section engaging with a threaded journal 8 mounted rotatably on the supporting element 13. By turning the screw 7 in either one or the other direction, the supporting element 5 will be tilted about the axis 6.

The phonograph pickup or scanning system shown has on its bottom side a stylus tip 28, which normally may be a sapphire, which is attached to a stylus holder 29. The tip 28 rests on a record 18. The angle between the plane of the record and the stylus holder 29 which extends in a longitudinal direction of the scanning system, is the so-called inclination angle, which should be set as nearly as possible at 15°, in order to avoid distortions in scanning. The pickup cartridge is attached to two screws 9′ and 9″, which pass through two lateral noses 24(FIG. 2) on the cartridge to a plate 10 equipped with tapped holes. The plate 10 in turn is attached to the support 13 by means of screws 25′ and 25″ which pass through longitudinal slots 11′ and 11″ in the support 13. After loosening the screws 25′ and 25″ the slots 11′ and 11″ will make possible a longitudinal adjustment of the cartridge in the tone arm, through which the so-called "overhang" can be adjusted.

Since the pickup cartridge is firmly connected with the tiltably mounted support 13, it will be possible through its adjustment via the screw 7 to set the inclination angle exactly at the prescribed value of 15°.

FIG. 1 shows an embodiment where a mechanically deformable supporting plate 13 is fixed in the housing 4 by means of a screw 30. When turning the screw 7, the plate 13 is deformed and as a result of that, it changes the inclination angle of the stylus 28.

Figure 2:
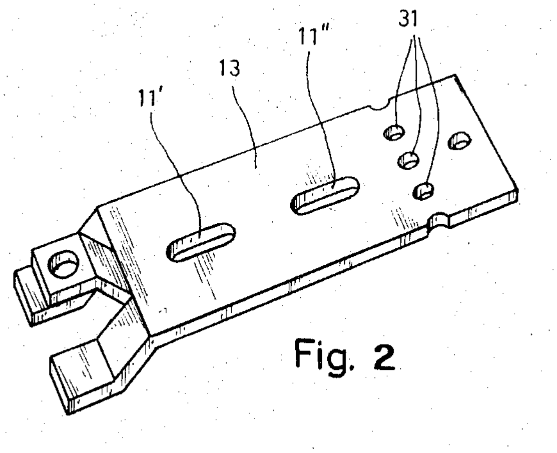
FIG. 2 shows an isometric view of the carrying element according to the invention.

FIG. 2 shows a preferred embodiment of a supporting plate 13, preferably made of metal. The plate is provided with a series of vertical apertures 31 adjacent the screw 30, which apertures, by weakening the plate along a transverse area, will allow the plate to bend adjacent the screw 7. Furthermore, one can recognize in FIG. 2 the longitudinal slots 11′ and 11″ which provide for the selective change of the overhang of the cartridge system. In the case of the adjustment of the overhang, the matter that is at stake is to achieve as much as possible a tangential engagement of the stylus system with the grooves of records of different diameters through changing of the distance between the pivotal axis 3 of the tone arm 1 and the stylus point 28.

In the case of the embodiment of the carrier element 13, as described, it is also possible to connect the element in the electrical circuit to develop the bearer element in such a manner as to provide an electrical shield for the housing 4.

I claim:

1. In a tone arm means for record players including a pivotal mounting means at one end for tilting about a horizontal axis with respect to a record surface, said tone arm means having support means for a pickup cartridge at the other end, said support means being attached to the tone arm means for tilting movement with respect to the longitudinal axis of the arm, said support means including an elongated plate, said plate being fixedly secured at one end to the tone arm means, said plate having a transversely weakened area adjacent said one end to provide a deformable pivot area, and adjustment means for support means whereby the tracking angle of the cartridge stylus may be varied, said adjustment means including a rotatable member extending between the tone arm means and the support means, said member having a threaded connection with one of said last two mentioned elements.

2. The invention as defined in claim 1, wherein said support means includes a horizontally arranged metal plate to provide an electrical shield for the tone arm means.

3. The invention as defined in claim 1, whereas said support means includes a horizontally arranged plate having a pair of elongated slots extending in the longitudinal direction of the arm, said pickup cartridge being provided with mounting screws to be adjustably slidably received in said slots.

* * * * *